United States Patent
Breau et al.

(10) Patent No.: US 9,154,993 B1
(45) Date of Patent: Oct. 6, 2015

(54) MOBILE-IPV6 ENCAPSULATION FOR WIRELESS NETWORKS

(71) Applicant: Sprint Spectrum L.P., Overland Park, KS (US)

(72) Inventors: Jeremy R. Breau, Kansas City, MO (US); Frederick C. Rogers, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/229,198

(22) Filed: Mar. 28, 2014

Related U.S. Application Data

(63) Continuation of application No. 11/699,656, filed on Jan. 30, 2007, now abandoned.

(51) Int. Cl.
*H04W 28/06* (2009.01)
*H04W 40/02* (2009.01)

(52) U.S. Cl.
CPC ............ *H04W 28/065* (2013.01); *H04W 40/02* (2013.01)

(58) Field of Classification Search
CPC ...... H04W 8/183; H04W 48/18; H04W 80/04
USPC ................... 455/432.1–432.3, 433, 436, 445; 370/389, 392, 471, 474
See application file for complete search history.

(56) References Cited

U.S. PATENT DOCUMENTS

| | | | |
|---|---|---|---|
| 6,487,406 B1 * | 11/2002 | Chang et al. | 455/422.1 |
| 2001/0015966 A1 * | 8/2001 | Casati | 370/338 |
| 2002/0062388 A1 * | 5/2002 | Ogier et al. | 709/238 |
| 2002/0071432 A1 * | 6/2002 | Soderberg et al. | 370/389 |
| 2004/0071120 A1 * | 4/2004 | Grech | 370/338 |
| 2004/0105420 A1 * | 6/2004 | Takeda et al. | 370/349 |
| 2007/0165561 A1 * | 7/2007 | Veerepalli | 370/328 |

FOREIGN PATENT DOCUMENTS

WO    WO 03039076 A1 *   5/2003

* cited by examiner

*Primary Examiner* — Dung Hong

(57) ABSTRACT

Systems and methods are provided for an optimized mobile-IPv6 encapsulation. A mobile node sends packets to a correspondent node by encapsulating a packet using an IPv6 routing extension header, and reverse tunneling the packet to a home agent. The home agent modifies the packet and forwards it to the correspondent node. When the correspondent node sends packets to the mobile node's home address, the home agent intercepts the packet, encapsulates the packet with an IPv6 routing extension header, and tunnels the packet to the mobile node. Consequently, because packets are tunneled using IPv6 routing extension headers, the amount of overhead in each encapsulated packet is reduced, thus increasing the available bandwidth in a network.

20 Claims, 7 Drawing Sheets

MOBILE-IPV6 ENCAPSULATION FOR WIRELESS NETWORKS

CROSS-REFERENCE TO RELATED APPLICATION

This application is a continuation of U.S. patent application Ser. No. 11/699,656, filed Jan. 30, 2007, which is hereby incorporated by reference in its entirety, and to which this application claims priority.

FIELD OF THE INVENTION

The present invention relates to mobile-IPv6 and, more particularly, to encapsulated packets sent to and from the home agent.

DESCRIPTION OF RELATED ART

Internet protocol version 6 (IPv6) is a standard used by electronic devices to communicate over a packet-switched internet. IPv6 is considered the successor to IP version 4 (IPv4), primarily because it supports a far greater number of unique IP-addresses. IPv4 supports 32-bit IP addresses, and therefore can only provide 4.3 billion unique IP-addresses. IPv6, on the other hand, supports 128-bit addresses, and thus can provide approximately $5*10^{28}$ unique IP-addresses. Additionally, IPv6 allows for the use of extension headers, which are described in S. Deering et. al., "Internet Protocol, Version 6 (IPv6) Specification," Request for Comments 2460, December 1998. IPv6 extension headers are optional headers that are appended to a standard IPv6 header. There are several different types of extension headers. For example, the routing extension header enables a packet to visit one or more intermediate nodes on its way to its final destination.

IPv6 packets generally include (1) a payload, which contains the data (i.e. voice, real-time media) that is being transmitted, and (2) a header, which contains all of the information necessary for the packet to reach its destination (i.e., the source IP-address and the destination IP-address). However, because of the increased address space used in IPv6 as opposed to IPv4, IPv6 headers are 40 bytes long, while IPv4 headers can be as small as 20 bytes.

Mobile-IPv6 allows mobile nodes to remain reachable at the same address while moving from one network to another. With mobile-IPv6, a mobile node obtains and uses a mobile-IP address referred to as a home address (HoA). Packets to and from the mobile-node are then routed through a centralized mobile-IPv6 home agent (home agent) located on the mobile node's home network, using a care-of address, which is a temporary IP-address used by a mobile node while it is located on a foreign network. The process of the home agent routing packets from the correspondent node to the mobile node is called "tunneling," while the process of the mobile node routing packets en route to the correspondent node through the home agent is called "reverse tunneling."

With tunneling, the home agent intercepts packets sent from the correspondent node to the mobile node and encapsulates packets by adding an additional 40-byte IPv6 header, called a tunnel header, to each packet. The tunnel header enables the packet to travel through the home agent on the way to its destination. The tunnel header indicates that the packet's source address is the home agent's address, and the packet's destination address is the mobile node's care-of address. The home agent then sends the encapsulated packet to the mobile-node, which decapsulates and processes the packet.

With reverse tunneling, the mobile node also encapsulates packets by adding a tunnel header to each packet. The tunnel header header indicates that the encapsulated packet's source the mobile node's home address, and that the encapsulated packet's destination is the home agent's address. When the home agent receives the encapsulated packet, it removes the tunnel header and forwards the packet to its intended location. Reverse tunneling provides added security because it ensures that packets sent between a mobile node and correspondent node follow the same route, thus lowering the possibility that packets are being sent by a malicious third party.

Unfortunately, however, encapsulated IPv6 packets contain 80 bytes of overhead—40 bytes for the original IPv6 header, and 40 additional bytes for the tunnel header. While this overhead is not substantial if the packet's payload is large, it becomes significant if the mobile node is sending packets with small payloads. Such a situation is common when the mobile node is transmitting voice or real-time media, because sending smaller packets increases the fidelity of the transmission. Therefore, an improvement is desired.

SUMMARY OF THE INVENTION

The present invention advances over the state of the art by providing an optimized mobile-IPv6 encapsulation scheme, in which a mobile node and a home agent encapsulate packets with an IPv6 routing extension header.

As presently contemplated, packets sent from the mobile node to a correspondent node will be (1) reverse tunneled from the mobile node to the home agent, (2) modified by the home agent, and (3) forwarded by the home agent to the correspondent node. The reverse tunneled packets will include a payload, an IPv6 header, and an IPv6 routing extension header. The IPv6 header will include the mobile node's home address as the source address, and the home agent's address as the destination address. The IPv6 routing extension header will include the correspondent node's address as the next-hop address. When the home agent receives the packet, the home agent will (1) substitute the destination address in the IPv6 header with IP address contained in the IPv6 routing extension header, (2) remove the IPv6 routing extension header, and (3) forward the packet to the correspondent node.

Additionally, the invention contemplates tunneling packets from the home agent to the mobile node by encapsulating the packets with an IPv6 routing extension header. Packets sent from the correspondent node include a payload and an IPv6 header. The IPv6 header includes the correspondent node's IP address as the source address, and the mobile node's home address as the destination address. The home agent intercepts the packets from the correspondent node, and encapsulates them by adding an IPv6 routing extension header to each packet. The IPv6 routing extension header includes the mobile node's home address as the next-hop address. The home agent also modifies each packet's IPv6 header by changing the destination address to the mobile node's care-of address. After modifying and encapsulating a packet, the home agent will tunnel it to the mobile node's care-of address. When the mobile node receives the packet, it processes and uses the packet.

Encapsulating packets with IPv6 24-byte routing extension headers is advantageous because it reduces the amount of overhead in each encapsulated packet, thus increasing the available bandwidth in a network. As technology that requires sending small payloads grow in popularity, the present invention may thus provide relief to networks.

DETAILED DESCRIPTION

1. Exemplary Architecture a. Exemplary Network

Figure 1:
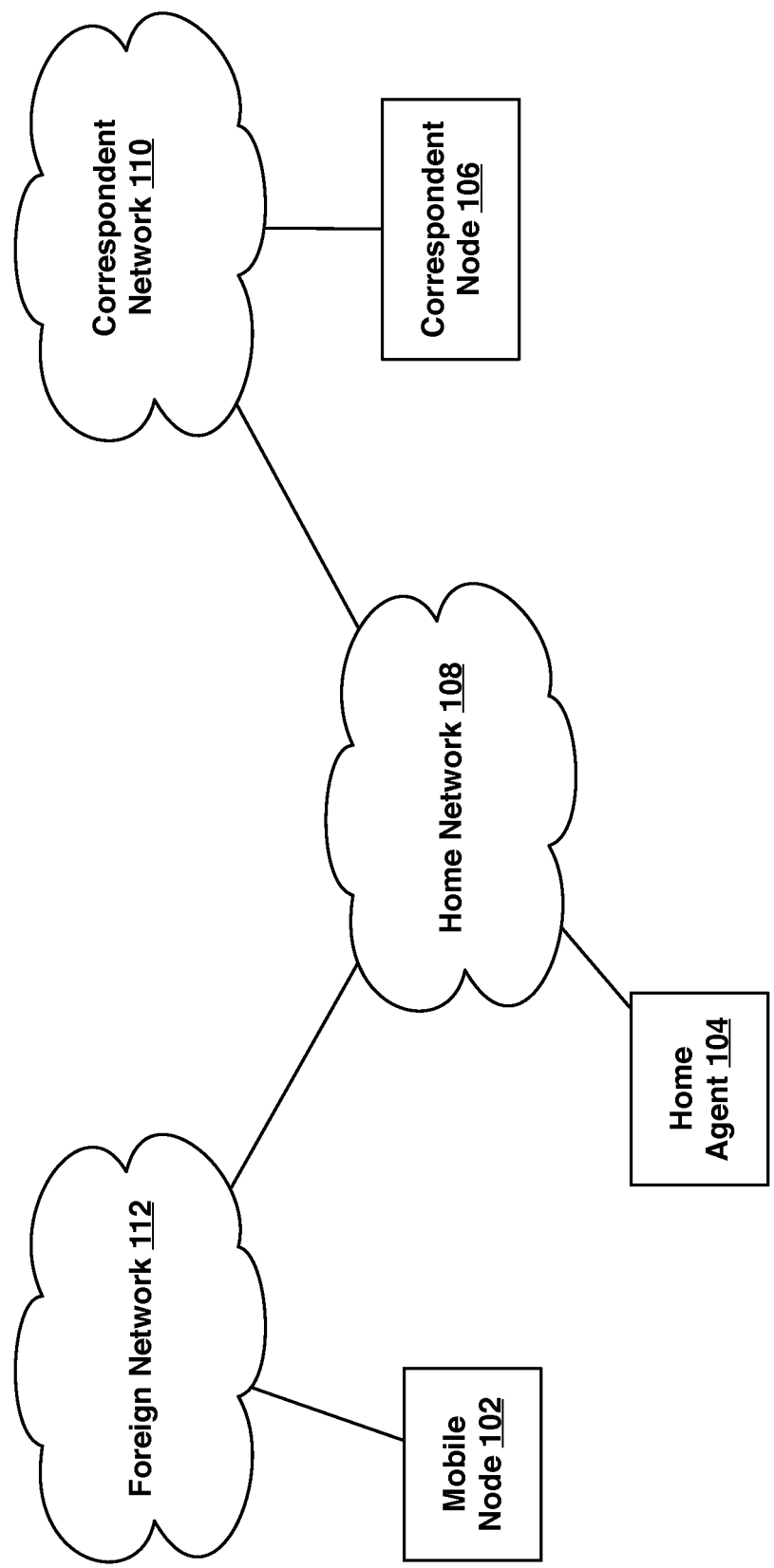
FIG. 1 is a simplified block diagram illustrating a typical mobile-IPv6 network.

FIG. 1 is a simplified block diagram depicting the functional arrangement and interaction between various network components in accordance with the exemplary embodiment. It should be understood that the depicted network supports mobile-IP. Further, this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, various functions described herein as being performed by one or more entities may be carried out by hardware, firmware, and/or software.

As shown in FIG. 1, a representative IP network includes a home network 108, a correspondent network 110, and a foreign network 112. Located on home network 108 is a home agent 104. Located on correspondent network 110 is a correspondent node 106. Located on foreign network 106 is a mobile node 102.

It should be understood that any number of other entities could be present as well. For example, any number of mobile nodes could be located on home network 106, IP network 110, and foreign network 112. Furthermore, any number of intermediate devices and networks could make up all or part of any of the communication links shown in FIG. 1. For example, there could be additional routers, wireless networks, or other devices, such as IP gateways and/or DHCP servers located on any of the networks.

In general, mobile node 102 and correspondent node 106 may be any device capable of using mobile-IPv6. As examples, mobile node 102 or correspondent node 106 may be, or may include one or more of the functions of, a cellular telephone, a voice-over-IP telephone, a laptop computer, or a personal digital assistant. Although mobile node 102 is depicted in FIG. 1 on foreign network 106, mobile node 102 could be on correspondent network 110 as well. Further, although correspondent node 106 is depicted in FIG. 1 on correspondent network 110, correspondent node 106 could be on any other network as well.

Home agent 104 may be any network device such as a router, server, or workstation that is configured to maintain current location information for mobile node 102. Home agent 104 is also configured to encapsulate and decapsulate packets, and to relay packets to mobile node 102 and correspondent node 106 in accordance with mobile-IPv6.

b. Exemplary Mobile Node

Figure 2:
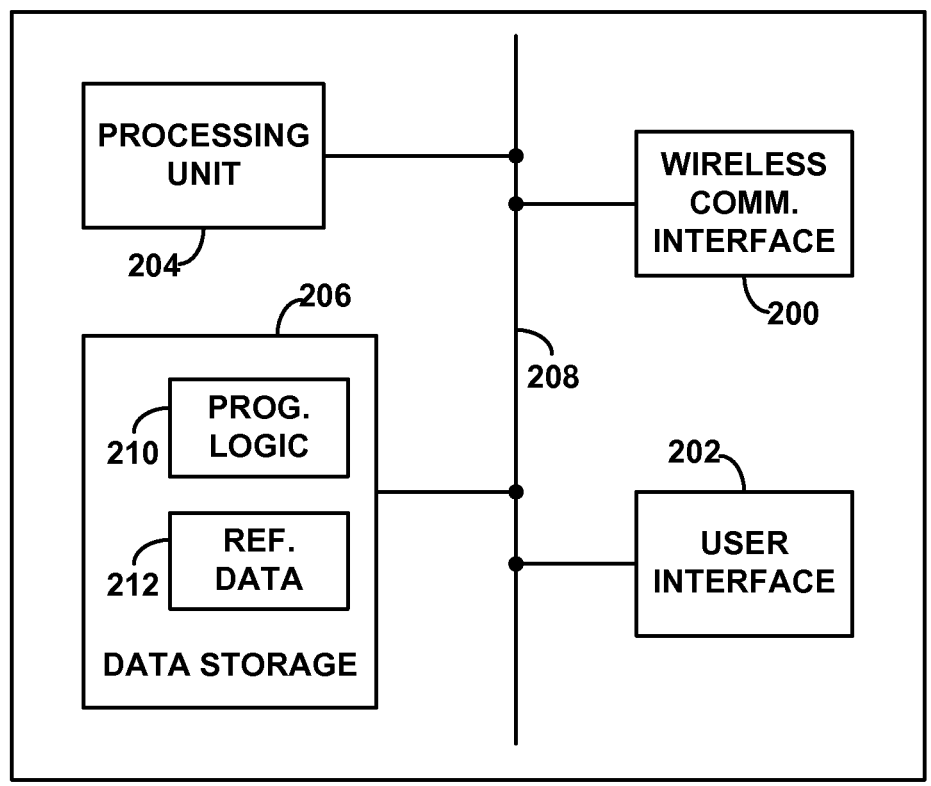
FIG. 2 is a simplified block diagram illustrating a typical mobile node.

Referring next to FIG. 2, a block diagram of an exemplary mobile node is provided, to illustrate functional components of such a device. Mobile node 102 may take the form shown. As illustrated in FIG. 2, the exemplary mobile node includes a wireless communication interface 200, a user interface 202 a processing unit 204, and data storage 206, all of which may be coupled together by a system bus, network, or other mechanism 208.

Wireless communication interface 200 comprises a mechanism for communicating over an air interface with a radio access network, so as to facilitate communication on a mobile-IPv6. As such, wireless communication interface 200 may include a "mobile station modem" chipset, such as one of the "MSM" chipsets available from Qualcomm Incorporated. Further, wireless communication interface 200 will preferably include one or more antennas to facilitate air interface communication.

User interface 202 comprises input and output components to facilitate user interaction with the device. For voice communication, the user interface 202 preferably includes a microphone and speaker. For visual communication, the user interface 202 may then further include a display screen and perhaps a camera. Additionally, the user interface 202 preferably includes a keypad or other mechanism to facilitate tactile user input.

Processing unit 204 comprises one or more general purpose processors (e.g., INTEL microprocessors) and/or one or more special purpose processors (e.g., digital signal processors). Data storage 206, in turn, comprises one or more volatile and/or non-volatile storage mechanisms, such as memory and/or disc-drive storage for instance, which may be integrated in whole or in part with processing unit 204.

As shown, data storage 206 includes program logic 208 and reference data 210. Program logic 208 comprises one or more logic modules (applications), and preferably includes machine language instructions executable by processing unit 304 to carry out various functions described herein, such as to (1) encapsulate IPv6 packets by adding an IPv6 routing extension header and (2) to send the encapsulated packet to a home agent. Reference data 310, in turn, includes data such the mobile-IP address assigned to the mobile node.

c. Optimized Mobile-IPv6 Packet

Figure 3:
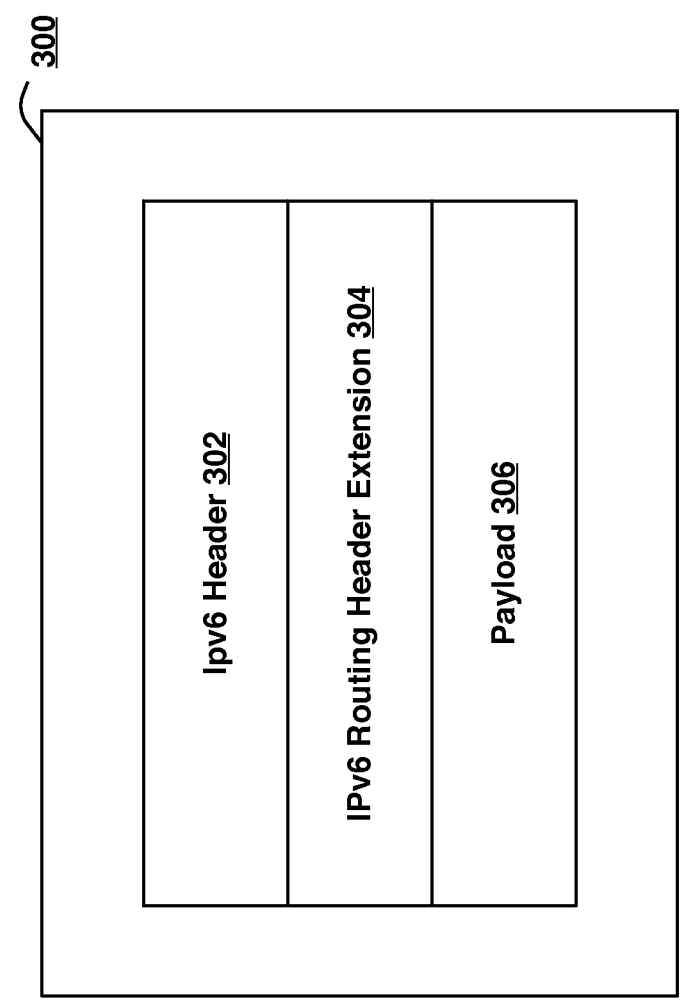
FIG. 3 is a simplified block diagram illustrating an optimized mobile-IPv6 packet.

Referring next to FIG. 3, a block diagram of an optimized mobile-IPv6 packet is provided. Packet 300 includes an IPv6 header 302, an IPv6 routing extension header 304, and a payload 306.

Figure 4:
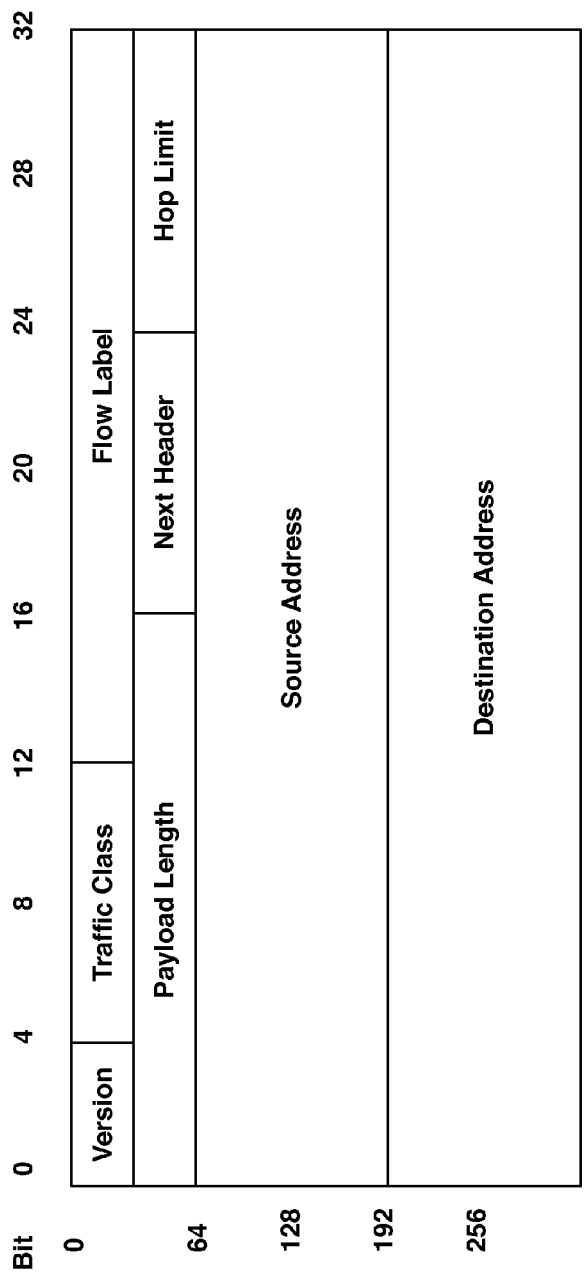
FIG. 4 is simplified block diagram illustrating an IPv6 header.

An exemplary IPv6 header 302 is shown in greater detail in FIG. 4. An IPv6 header includes all the information necessary for a packet to reach its destination. The "version" field indicates which version of Internet Protocol is being used. The "traffic class" field enables mobile nodes and routers to identify and distinguish between different classes or priorities of IPv6 packets. The "flow label" field identifies all packets belonging to a specific class-of-service, allowing routers to handle the packets in a similar fashion. The "payload length" field specifies the length of the IPv6 payload. The "next header field" indicates whether there are any additional IPv6 headers or IPv6 extension headers following the IPv6 header. For example, a next header value of 43 indicates that the extension header appended to the IPv6 header is a routing extension header. Finally, the "source address" field includes the packet's originating IP-address, while the "destination address" includes the IP-address of the packet's intended destination.

Figure 5:
FIG. 5 is simplified block diagram illustrating an IPv6 routing extension header.

An exemplary IPv6 routing extension 304 header is shown in greater detail in FIG. 5. IPv6 routing extension headers enable a packet to visit one or more intermediate nodes before reaching its destination. Further, routing extension headers are not examined or processed until the packet reaches the node identified in the destination address field of the packet's IPv6 header.

Referring to FIG. 5, the "next header" field identifies whether there is another header immediately following the routing extension header. The "header length" field indicates the length of the routing extension header. The "routing type" field indicates what type of routing header is used. For example, a type 0 routing extension header can include one or more next hop addresses, while a type 2 routing extension header is restricted to a single next hop address. Additionally, there are no address restrictions in type 0 extension headers, while the address in a type 2 extension header must be the mobile-node's home address.

The "segments left" field indicates the number of route segments remaining before the packet reaches its destination. The "reserved" field is initialized to zero for transmission, and is ignored on reception. Finally, the "next hop address" field includes the address of the next device to receive the packet.

Payload 306 is a standard IPv6 payload, and can carry between 0 and 1400 bytes of data. Payload 302 can be any type of data, such as voice, real-time media, text, etc.

2. Exemplary Operation a. Reverse Tunneling

Figure 6:
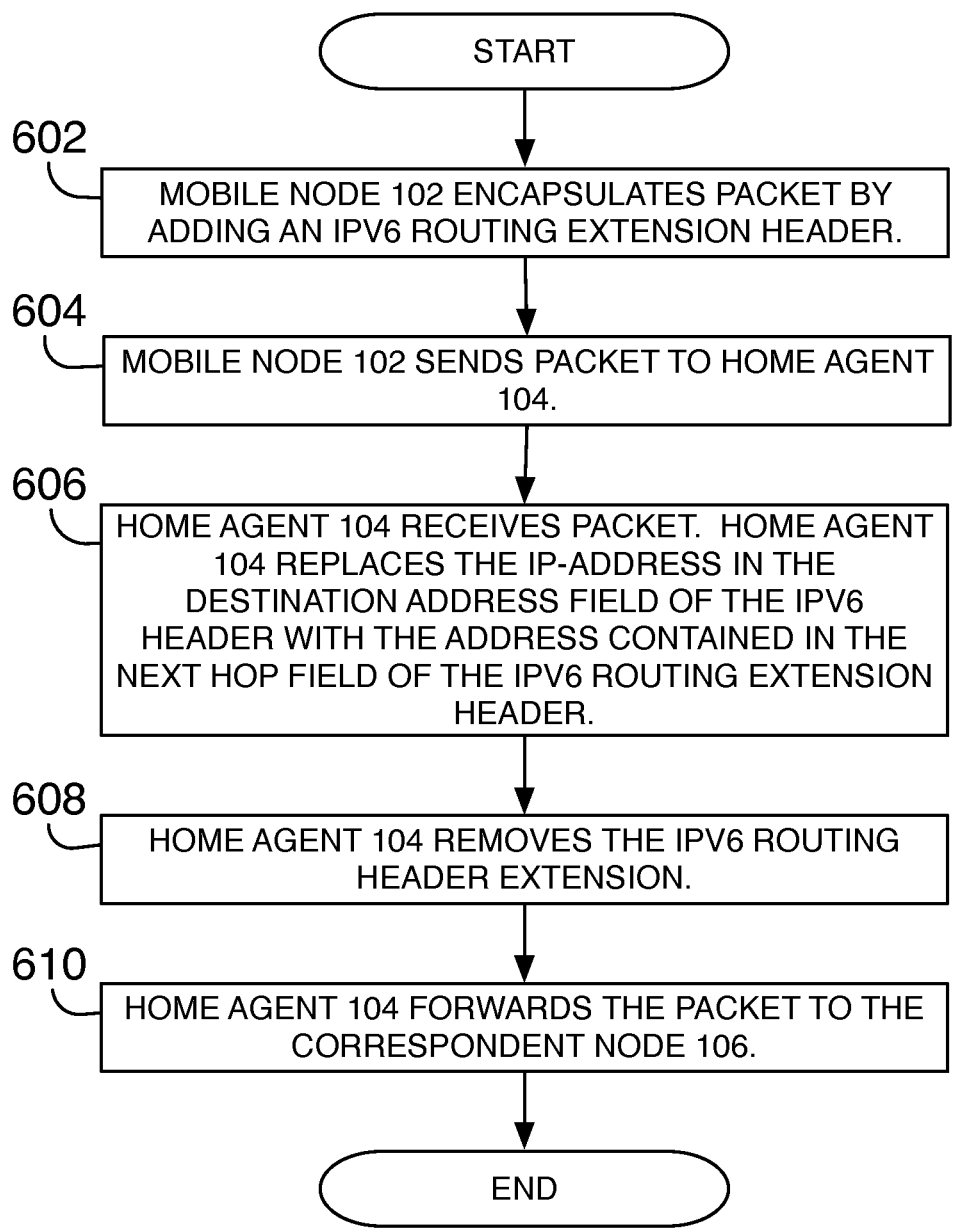
FIG. 6 is a flow chart depicting the optimized encapsulation, reverse tunneling, and processing of an IPv6 packet.

FIG. 6 is a flow chart depicting reverse tunneling operation in accordance with an embodiment of the invention. In particular, FIG. 6 depicts (1) a mobile node encapsulating an IPv6 packet with an IPv6 routing extension header, (2) a home agent processing the encapsulated packet, and (3) the home agent forwarding the processed packet to a correspondent node.

As shown in FIG. 6, at step 602, mobile node 102 encapsulates a packet with an IPv6 routing extension header. The next-hop field of the IPv6 routing extension header contains the IP address of correspondent node 106. The source-address field of the packet's IPv6 header contains the home address of mobile node 102, while the destination-address field of the IPv6 header contains the IP-address of home agent 104.

At step 604, mobile node 102 reverse tunnels the packet by sending it to home agent 104. At step 606, home agent 104 receives and begins processing the packet. Home agent 104 modifies the IP-address contained in the source address field of the IPv6 header by replacing it with the IP-address contained in the next-hop field of the IPv6 routing extension header. Next, at step 608, home agent 104 removes the IPv6 routing extension header from the packet. Thus, the processed packet is now a standard IPv6 packet that includes a payload and an IPv6 header. The IPv6 header indicates that the packet's source is the home address of mobile node 102, and that the packet's destination is the address of correspondent node 106.

At step 410, home agent 104 sends the packet to the address contained in the destination-address field of the packet's IPv6 header. In this case, home agent 104 sends the packet to correspondent node 106.

It should be understood that there are several ways in which home agent 104 could modify packets received from mobile node 102. In addition to the method described above, home agent 104 could modify packets sent from mobile node 102 by creating new packets embodying the modification. For instance, home agent 104 could (1) copy the data contained in each received packet's payload into each new packet's payload, (2) insert the IP-address from the source address field of each received packet's IPv6 header into the source address field of each new packet's IPv6 header, and (3) insert the IP-address in from the next-hop field of each received packet's IPv6 routing extension header into the destination-address field of each new packet's IPv6 header.

b. Tunneling

Figure 7:
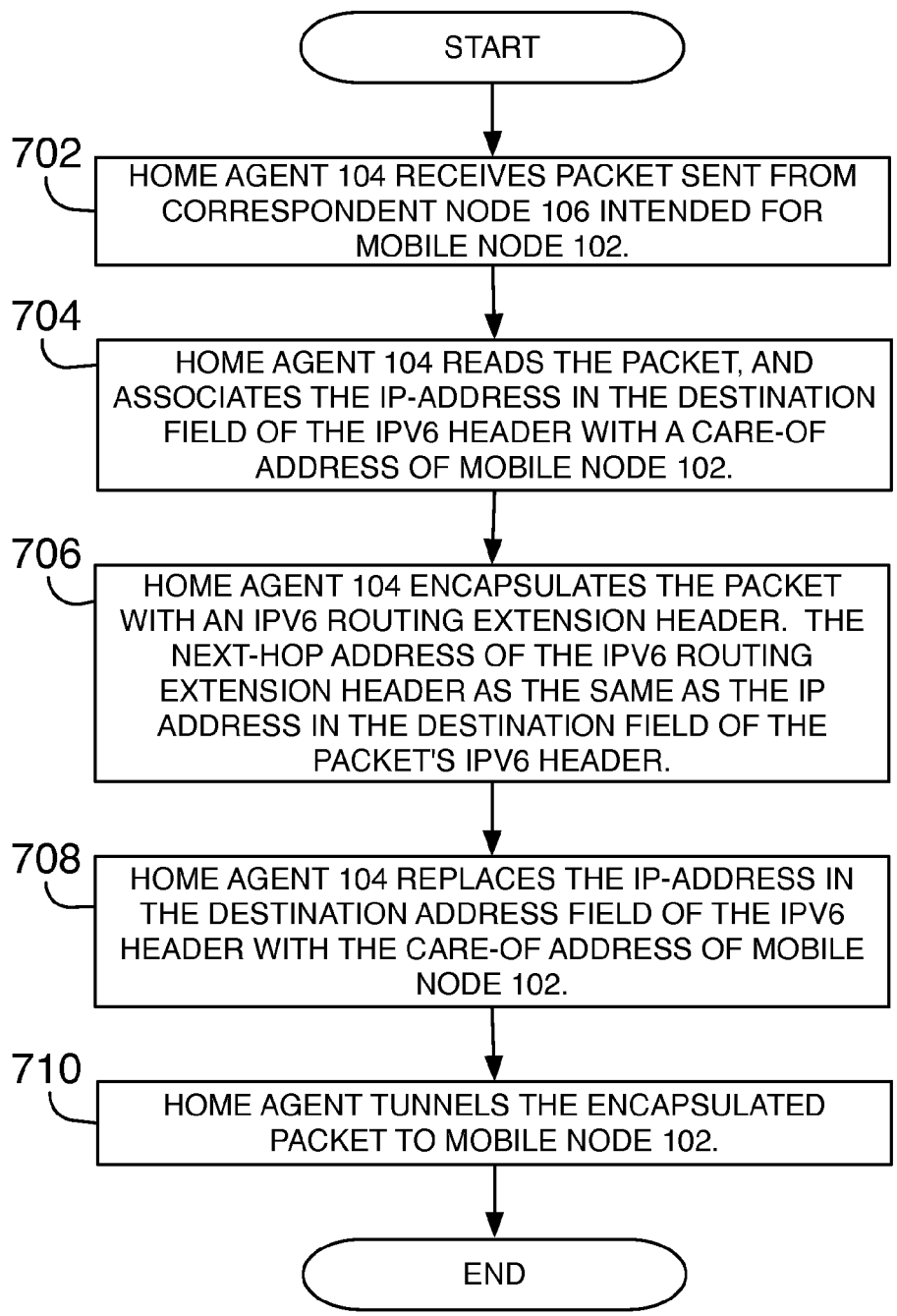
FIG. 7 is a flow chart depicting the optimized encapsulation and tunneling of an IPv6 packet.

FIG. 7 is a flow chart depicting tunneling operation in accordance with an embodiment of the invention. In particular, FIG. 5 depicts a home agent (1) encapsulating an IPv6 packet sent from a correspondent node to a mobile node with an IPv6 routing extension header, and (2) tunneling the encapsulated packet to the mobile node.

At step 702, home agent 104 receives a packet sent from correspondent node 106. The packet's IPv6 header indicates that the packet's source address is the IP address of correspondent node 106, and the packet's destination address is the home address of mobile node 102. At step 704, home agent 104 reads the destination-address field of the packet's IPv6 header and determines that its intended destination is the home-address of mobile node 102. Home agent 104 then associates mobile node 102's home address with mobile-node 102's care-of address. Home agent 104 may contain a list of addresses in a database, or it may query an external server to determine a care-of address that associated with mobile node 102.

Next, at step 706, home agent 104 encapsulates the packet by adding to the packet an IPv6 routing extension header. The next-hop field of the routing extension header is the same as the IP-address contained in the destination address field of the packet's IPv6 header. In this case, the IP-address is home address of mobile node 102. At step 708, home agent 106 modifies the packet's IPv6 header by changing the header's destination address to the care-of address of mobile-node 102, which enables the packet to reach the mobile node while it is located on foreign network 112.

Finally, at step 710, home agent 104 tunnels the encapsulated packet to mobile node 102, which processes the packet for use with an appropriate application.

It should be understood that there are several ways in which home agent 104 could modify packets received from correspondent node 106. In addition to the method described above, home agent 104 could modify packets sent from mobile node 106 by creating new packets embodying the modification. For example, home agent 104 could (1) copy the data contained in each received packet's payload into each new packet's payload, (2) insert the IP-address from the source address field of each received packet's IPv6 header into the source address field of each new packet's IPv6 header, (3) insert the IP-address contained in the destination-address field the received packet's IPv6 header into the next-hop field of the new packet's IPv6 routing extension header, and (4) insert a care-of address associated with the IP-address from the destination-address field the received packet into the destination address field of the new packet's IPv6 header.

3. Conclusion

An embodiment of the present invention has been described above. Those skilled in the art will understand, however, that changes and modifications may be made to this embodiment without departing from the true scope and spirit of the present invention, which is defined by the claims.

We claim:

1. A method comprising:
   receiving, by a home agent, an IPv6 packet, wherein the IPv6 packet contains a payload and an IPv6 header, wherein the IPv6 header encapsulates the payload, wherein the IPv6 header includes a source address field and a destination address field, wherein the source address field indicates a correspondent node address of a correspondent node that transmitted the IPv6 packet, and wherein the destination address field indicates a mobile node address;
   in response to receiving the IPv6 packet, inserting, by the home agent, an IPv6 routing header between the IPv6 header and the payload, wherein the IPv6 routing header indicates the mobile node address as an ultimate destination of the IPv6 packet, and wherein the routing header is fewer bytes than the IPv6 header;
   based on the mobile node address, determining, by the home agent, a care-of address associated with the mobile node address;
   overwriting, by the home agent, the destination address field of the IPv6 header with the care-of address;
   transmitting, by the home agent, the IPv6 packet as modified to the care-of address, wherein the care-of address identifies a mobile node associated with the mobile node address;
   receiving, by the home agent, a second IPv6 packet from the mobile node, wherein the second IPv6 packet contains a second payload, a second IPv6 header, and a second IPv6 routing header, wherein the second IPv6 header includes a second destination address field, and wherein the second IPv6 routing header includes an address field; and
   in response to receiving the second IPv6 packet, replacing the second destination address field of the second IPv6 packet with the address field of the second IPv6 routing header.

2. The method of claim 1, wherein the care-of address is a temporary address used by the mobile node while the mobile node is served by a foreign network.

3. The method of claim 1, wherein the IPv6 header is 40 bytes and the IPv6 routing header is 24 bytes.

4. The method of claim 1, wherein the home agent is located in a home network of the mobile node.

5. The method of claim 1, wherein determining the care-of address associated with the mobile node address comprises looking up the care-of address in a list of addresses stored at the home agent.

6. The method of claim 1, wherein determining the care-of address associated with the mobile node address comprises querying an external server to determine the care-of address.

7. The method of claim 1, wherein prior to replacing the second destination address field of the second IPv6 packet, the second destination address field of the second IPv6 packet contained a home agent address of the home agent and the address field of the second IPv6 routing header contains the correspondent node address of the correspondent node.

8. The method of claim 1, wherein the second IPv6 packet also includes a second source address field containing the mobile node address.

9. A home agent device comprising: at least one processor; data storage; and
   program instructions, stored in the data storage, that upon execution by the at least one processor, cause the home agent device to perform operations including:
   receiving an IPv6 packet, wherein the IPv6 packet contains a payload and an IPv6 header, wherein the IPv6 header encapsulates the payload, wherein the IPv6 header includes a source address field and a destination address field, wherein the source address field indicates a correspondent node address of a correspondent node that transmitted the IPv6 packet, and wherein the destination address field indicates a mobile node address;
   in response to receiving the IPv6 packet, inserting an IPv6 routing header between the IPv6 header and the payload, wherein the IPv6 routing header indicates the mobile node address as an ultimate destination of the IPv6 packet, and wherein the routing header is fewer bytes than the IPv6 header;
   based on the mobile node address, determining a care-of address associated with the mobile node address;
   overwriting the destination address field of the IPv6 header with the care-of address;
   transmitting the IPv6 packet as modified to the care-of address, wherein the care-of address identifies a mobile node associated with the mobile node address;
   receiving a second IPv6 packet from the mobile node, wherein the second IPv6 packet contains a second payload, a second IPv6 header, and a second IPv6 routing header, wherein the second IPv6 header includes a second destination address field, and wherein the second IPv6 routing header includes an address field; and
   in response to receiving the second IPv6 packet, replacing the second destination address field of the second IPv6 packet with the address field of the second IPv6 routing header.

10. The home agent device of claim 9, wherein the care-of address is a temporary address used by the mobile node while the mobile node is served by a foreign network.

11. The home agent device of claim 9, wherein the IPv6 header is 40 bytes and the IPv6 routing header is 24 bytes.

12. The home agent device of claim 9, wherein the home agent device is located in a home network of the mobile node.

13. The home agent device of claim 9, wherein determining the care-of address associated with the mobile node address comprises looking up the care-of address in a list of addresses stored at the home agent device.

14. The home agent device of claim 9, wherein determining the care-of address associated with the mobile node address comprises querying an external server to determine the care-of address.

15. The home agent device of claim 9, wherein prior to replacing the second destination address field of the second IPv6 packet, the second destination address field of the second IPv6 packet contained a home agent address of the home agent device and the address field of the second IPv6 routing header contains the correspondent node address of the correspondent node.

16. The home agent device of claim 9, wherein the second IPv6 packet also includes a second source address field containing the mobile node address.

17. A system comprising:
   a mobile node associated with a mobile node address and a care-of address; a correspondent node associated with a correspondent node address; and
   a home agent associated with a home agent address, wherein the home agent is configured to receive, from the correspondent node, an IPv6 packet, wherein the IPv6 packet contains a payload and an IPv6 header, wherein the IPv6 header encapsulates the payload, wherein the IPv6 header includes a source address field and a destination address field, wherein the source address field indicates the correspondent node address, and wherein the destination address field indicates the mobile node address, wherein the home agent is further configured to, in response to receiving the IPv6 packet, insert an IPv6 routing header between the IPv6 header and the payload, wherein the IPv6 routing header indicates the mobile node address as an ultimate destination of the IPv6 packet, and wherein the routing header is fewer bytes than the IPv6 header, wherein the home agent is further configured to, based on the mobile node address, determine a care-of address associated with the mobile node address and overwrite the destination address field of the IPv6 header with the care-of address, wherein the home agent is further configured to transmit the IPv6 packet as modified to the care-of address, wherein the home agent is further configured to receive a second IPv6 packet from the mobile node, wherein the second IPv6 packet contains a second payload, a second IPv6 header, and a second IPv6 routing header, wherein the second IPv6 header includes a second destination address field, and wherein the second IPv6 routing header includes an address field, and wherein the home agent is further configured to replace the second destination address field of the second IPv6 packet with the address field of the second IPv6 routing header.

18. The system of claim 17, wherein the mobile node is configured to receive the IPv6 packet and remove the IPv6 routing header from the IPv6 packet.

19. The system of claim 17, wherein the home agent is located in a home network of the mobile node.

20. The system of claim 17, wherein determining the care-of address associated with the mobile node address comprises querying an external server to determine the care-of address.

* * * * *